8327X
G. HOTCHKISS.
THRESHING MACHINE.
Patented July 25, 1834.
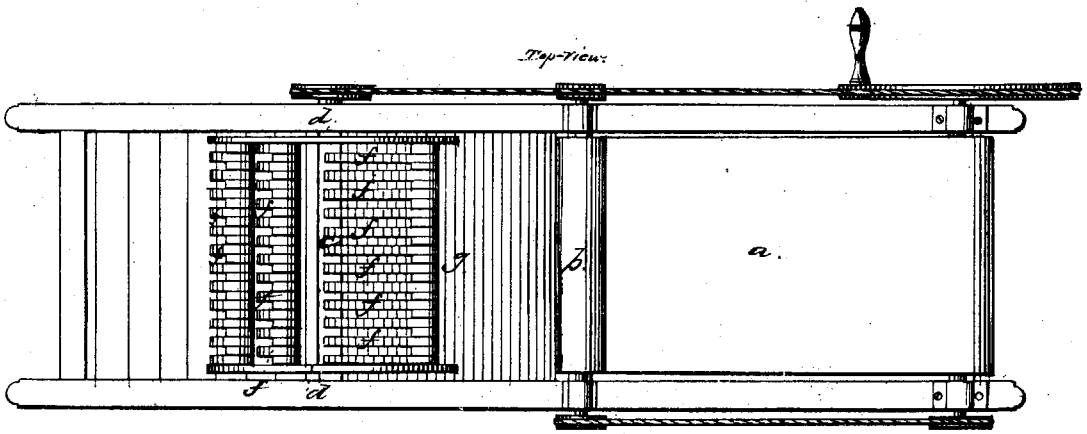
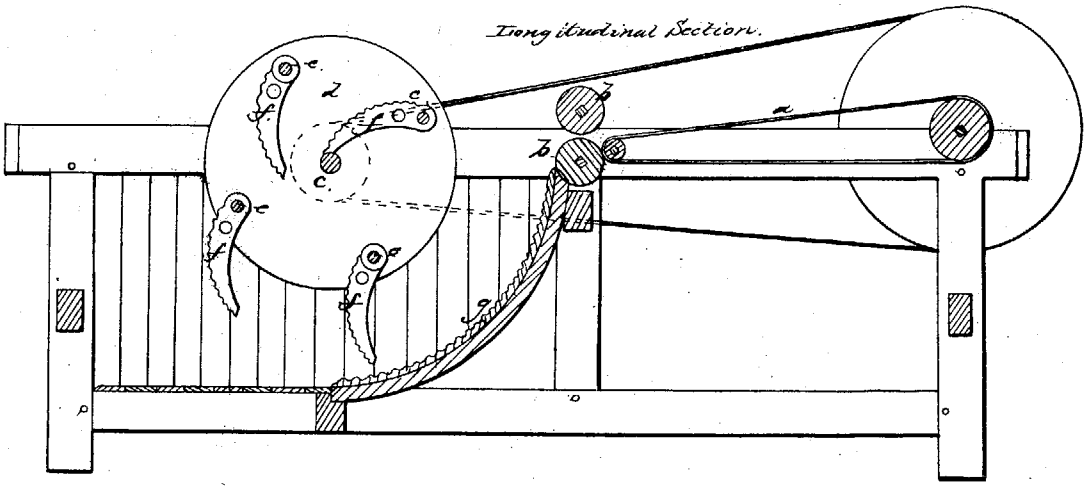
THE NORRIS PETERS CO., PHOTO-LITHO., WASHINGTON, D. C.

July 25. 1834 | 25.

Gideon Hotchkiss 8327X

The Schedule referred to in these Letters Patent and making part of the same containing a description in the words of the said Gideon Hotchkiss himself of his improvement in the construction of the Thrashing Machine. To all persons to whom these Presents shall come. Be it known that I Gideon Hotchkiss of the Town of Windsor in the County of Broome and State of New York have invented a new and useful improvement in the Thrashing Machine used for separating wheat, barley, rye, oats, millet, buckwheat and other small grain from the haulm or straw, and that the following is a full and exact description of the construction and operation of said machine as invented or improved by me. This Machine is placed upon a frame of suitable dimensions and is composed of wood or cast iron or part of wood and the other part of iron. The fall-piece is so constructed as to consist of a part of a circle and is usually made of wood and plated with iron, or otherwise of cast iron or other metal, and whether made of wood and plated with iron or cast metal, in either case said fall piece is to be so construct-ed as to consist of concavities and convexities, and to present an uneven surface. The apron may be placed level or slanting, the grain is placed on this and is passed into the machine, and may pass between rollers or not. The moving parts of this machine consist of an iron axle or shaft of suitable length and dimensions, and near one end of which is placed a [illegible] or pulley to receive a strap or band which communicates motion to said machine, also on said shaft or axle is placed two or more heads of iron or other metal of suitable diameter and with a number of holes in each head

[illegible]

To these heads the beaters are connected by iron rods
or bolts in such a manner as to turn on said rods or
bolts in lieu of hinges and thereby striking a more
forcible blow on the haulm or straw, than they could
do provided they were permanently fixed on a drum,
and at the same time if necessary yielding to any hard
substance that may be contained in said — — —
haulm or straw, said beaters may be composed of
iron or otherwise of part iron and part wood. Said
beaters are constructed of sufficient dimensions to admit
of a number of holes in each and where the rods or bolts
pass through the same and thereby possess the means of being
easily changed so as to suit any kind of grain whether
the same requires much or little beating to separate the
same from the straw and also to increase or diminish
the diameter of said beaters, said beaters if constructed
of iron ought to be of sufficient bigness to possess weight
or gravity sufficient to strike a blow hard enough to
separate the grain from the straw, one side or edge of
said beater is left straight and the other side or edge
of the same is crimped or cut into teeth or otherwise
crimped and also cut. The parts to which I lay
claim as originals are chiefly in the construction
of the frame, the same being of sufficient dimensions
to receive the shaft or axle, and if constructed mostly
of cast metal made with loops or groves so as to receive
the legs to support the same, at a convenient height
and also with places in lieu of boxes, for the axle or
shaft to turn on, and also like places for feeding roll-
ers, if used, and also with loops or groves to receive
the apron and cover or top of the same, and also for
having the fall or heel piece attached to the same, this
being more simple less expensive more permanent more nearly taken down, and moved or laid away) when
not wanted for use, than the usual mode of making them,
And secondly the bed piece of the same whether the same
be of cast metal or wood and plated with iron, may be
graved or formed of hollows and rounds or concavities
and convexities in such a manner as to form uneven
surfaces, and yet form a part of a circle in such a way
as to form a proper curve for the rollers or beaters to [illegible]
ing, and prevent the straw from escaping before it is thor-
oughly thrashed. These uneven surfaces in the bed piece
may lay parallel to the shaft or axle or they may be cir-
cular, or they may be angular or else they may be placed
in a position not parallel with the shaft or axle. The
presenting these uneven surfaces in the bed piece, aids
greatly to facilitate the separating the grain from
the straw and is preferable to spikes or any other way
now in use, Thirdly, the yealding beater, if construc-
ted of iron or else of iron and wood, if of iron the same
being formed of one piece, and so constructed as that
whilst one part strikes the blow the other part being
crimped or cut into teeth or both may more perfect-
ly separate the grain from the straw and is preferable
to those beaters in which are placed spikes or nails,
they being subject to become loose and sometimes to come
out and thereby to injure the machine and endanger
the lives of those persons who may be near them, And
also by having a number of holes in the ends of the beaters
for the rods or bolts to pass through, in which they then
may thereby with little trouble, be placed in a great
variety of positions, so as better to produce the desired
operation on different kinds of grain and to add to
or diminish the size of the roller as may be wanted.
thereby adjusting the machine to any kind of grain and greatly adding to the performing the operation of separating the grain from the straw in a short space of time. Also the heads being formed with a number of holes in each for threads or bolts to slip through greatly adds to the convenience of altering the heaters to efficient kinds of grain Witnesses Gideon Hotchkiss P. M. B. Eli Pratt Dec, 1837 A. Wenoe 1041.0